JOHN MERCIER'S
73024 IMPROVED HARROW

PATENTED JAN 7 1868

WITNESSES

INVENTOR

United States Patent Office.

JOHN MERCIER, OF DETROIT, MICHIGAN, ASSIGNOR TO ISRAEL KINNEY, OF SAME PLACE.

Letters Patent No. 73,024, dated January 7, 1868.

IMPROVEMENT IN HARROWS.

The Schedule referred to in these Letters Patent and making part of the same.

TO WHOM IT MAY CONCERN:

Be it known that I, JOHN MERCIER, of Detroit, in the county of Wayne, and State of Michigan, have invented a new and useful Improvement in Harrows; and I do declare that the following is a true and accurate description thereof, reference being had to the accompanying drawings, and to the letters of reference marked thereon, and making a part of this specification.

The same letters indicate like parts in each figure.

Figure 1:
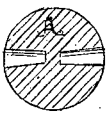
Figure 1 is a sectional view of my ball-joint.
Figure 2:
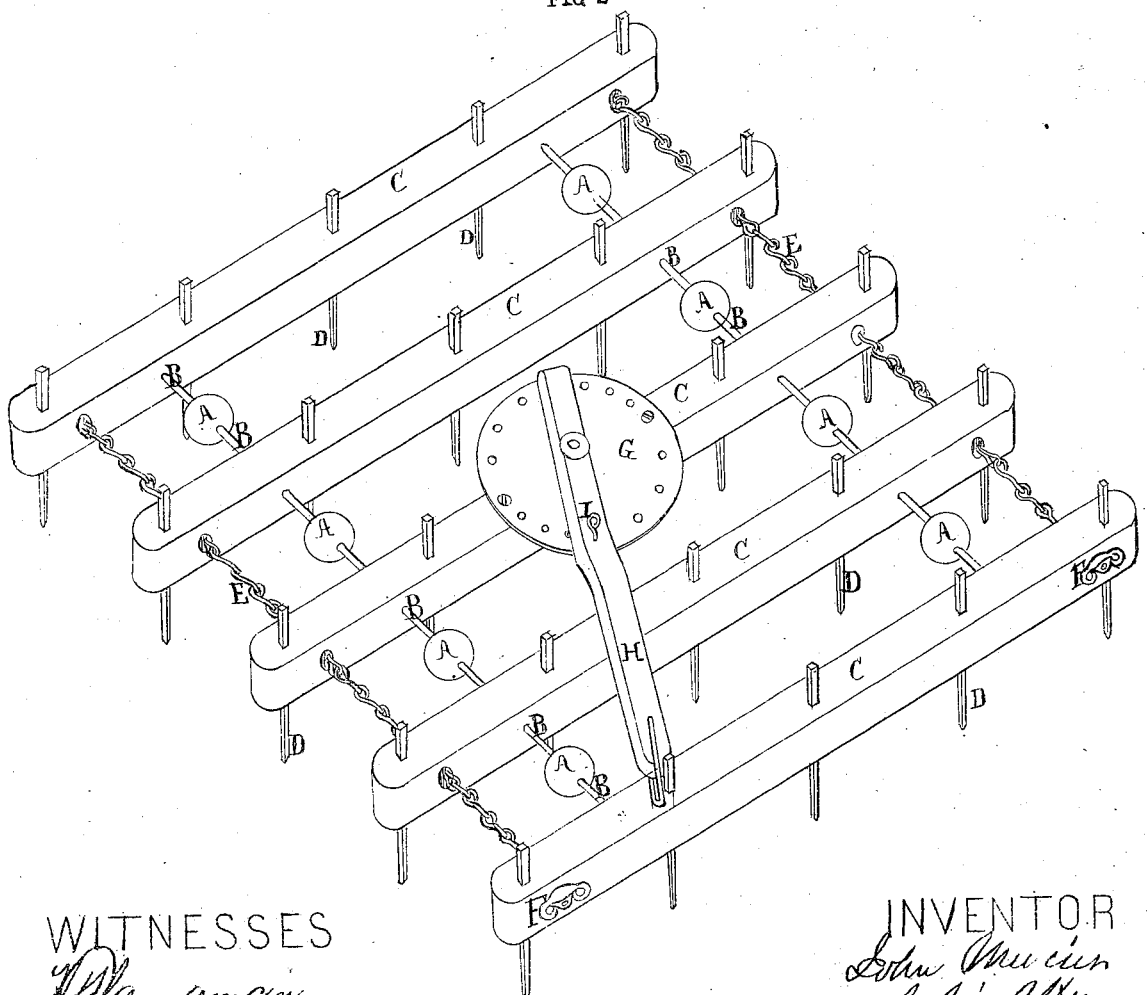
Figure 2 is a perspective view of a harrow constructed with the ball-joint.

The object of my invention is to so construct a harrow or cultivator as to enable it to be used with ease upon uneven ground, and so that it will thoroughly do its work in passing over elevations or depressions in the ground. Another object I have in view is to so construct a harrow or cultivator that the draught is applied directly in the centre, and supplied with a revolving draw-bar, so that it may be drawn in any direction without being obliged to turn the harrow or cultivator around. This is done by the peculiar construction of the draught-bar, which is attached to the harrow or cultivator, and revolves as may be required, and is held in any desired position by a pin passing through proper holes in a disk.

Having thus described the construction and uses of my invention, I will now name its various parts, so that those skilled in the art can manufacture it.

C C C C C are the stiles, through which are inserted, at proper points, the teeth D D D D D, &c. These stiles C C, &c., are held together by chains E E, which pass through holes bored near the ends of the stiles, while they are fastened to the outer stiles by the nuts or thumb-pieces F F. B B, &c., are rods, one end of which is fastened in the stiles, while the other is inserted into a proper cavity or hole cast or bored into the blocks or balls A A, &c. These cavities or holes are so bored as to allow the rods B B to play in them, so that the blocks or balls, when used in conjunction with the rods, form joints, which allow any stile to rise or drop, to fit the inequalities in the ground. G is a disk, with holes punched at intervals around its outer edge, to receive the pin I, which passes through the draught-bar H and into the holes in the disk, to hold the draught-bar in any desired position. This disk is fastened in the centre of the centre stile of the harrow or cultivator, which gives greater ease to the team used in drawing it. When cultivator-teeth are used, instead of the ordinary harrow-teeth, and it is required to drag the implement from one field to another, it can be done without disturbing the earth, by reversing the draught-bar, when the teeth will slide over the ground.

What I claim as my invention, and desire to secure by Letters Patent, is—

1. The blocks or balls A A, &c., with holes cast or bored, and the rods B B, &c., when constructed substantially as and for the purpose described.

2. The combination of the above-described blocks or balls A A, &c., and rods B B, &c., in conjunction with harrows or cultivators, when constructed substantially as described and for the purposes set forth.

3. The disk G, the draught-bar H, and the pin I, when attached to cultivators or harrows, in the manner and for the purposes described.

JOHN MERCIER.

Witnesses:
H. S. HANNAMAN,
GEO. RUHLANDT.